L. MARVIN.
Fruit and Vegetable Drier.
No. 233,157. Patented Oct. 12, 1880.
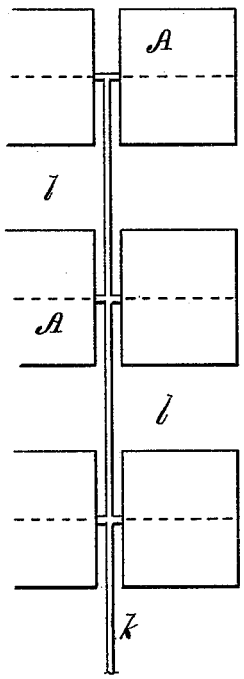
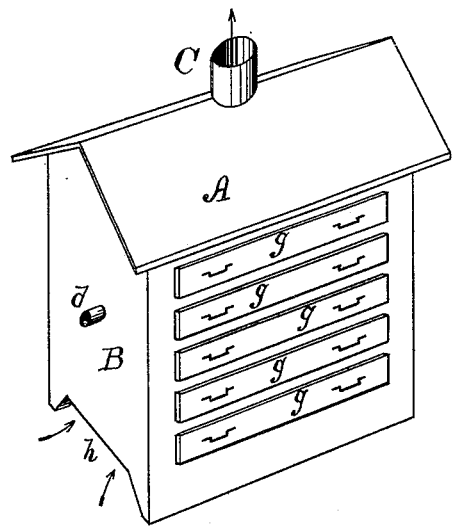
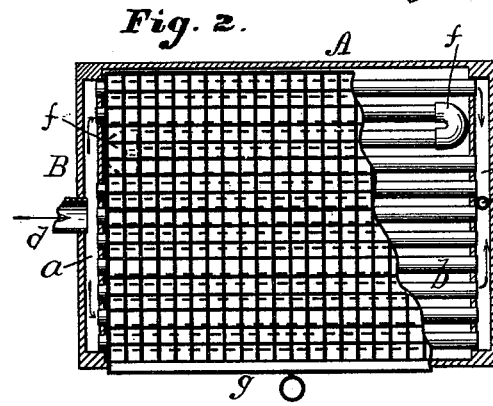
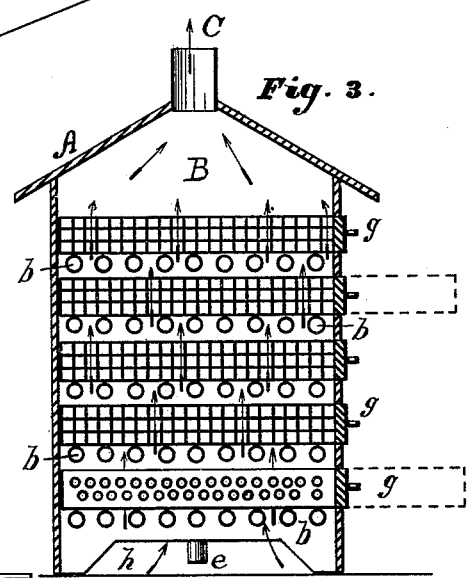
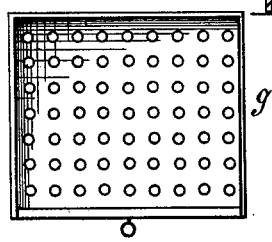
Attest:
Alex. Ross.
Robt. M. Kinney.
Inventor:
Luke Marvin.
By E. B. Whitmore,
Atty.

UNITED STATES PATENT OFFICE.

LUKE MARVIN, OF ROCHESTER, NEW YORK, ASSIGNOR OF TWO-THIRDS OF HIS RIGHT TO ROBERT McKINNEY, OF DETROIT, MICHIGAN, AND NATHAN ENGLISH, OF GREECE, NEW YORK, ONE-THIRD TO EACH.

FRUIT AND VEGETABLE DRIER.

SPECIFICATION forming part of Letters Patent No. 233,157, dated October 12, 1880.

Application filed December 20, 1879.

*To all whom it may concern:*

Be it known that I, LUKE MARVIN, of Rochester, in the county of Monroe and State of New York, have invented a new and useful Improvement in Fruit and Vegetable Evaporators, which improvement is fully set forth in the following specification and accompanying drawings, in which—

Figure 1 is a perspective view of the house or case of my new drying apparatus; Fig. 2, a horizontal section of the same; Fig. 3, a vertical section, and Figs. 4 and 5 details.

My invention relates to a process for drying fruit and vegetables in large quantities for the market by means of currents of air and steam or furnace heat; and it consists substantially in the construction and arrangement of the several parts of the device hereinafter fully described, and more particularly pointed out in the claims.

In the drawings, A is the house or case of my fruit-drier, which may be of any convenient shape or size, and should be substantially air-tight at its joints, with draft-openings $h$ at the bottom and a flue, C, through the cover or top. As shown in Fig. 2, the end walls, B, of the case are hollow, and pipes $b$ communicate between the end cavities, $a\ a'$, of the said walls B. The pipes are arranged side by side, forming several horizontal layers, one over another and some little distance apart, as shown in Fig. 3, each layer or group constituting a radiator for the heat that passes through the pipes, said heat or steam being admitted into the cavity $a$ of the head through a pipe, $d$. The front wall of the case is pierced by one or more horizontal rectangular openings, through which to receive sliding drawers $g$, which constitute the pans for holding the fruit or other substances to be dried.

The openings in the front wall to receive the drawer-pans are so arranged with reference to the radiators that when the said pans are put into their places they rest with their bottoms directly upon said radiators and receive the heat therefrom, as shown in Figs. 2 and 3, the said horizontal layers or groups of pipes being sufficiently distant from each other to receive the drawers between them.

I design to make the pans of sieve-wire or wire-cloth, or of perforated sheet metal, as shown in Fig. 4; but prefer to make them of wire, as shown in Figs. 2 and 3.

If the drawer-pans be filled with prepared fruit or vegetables and placed in position, as shown in Fig. 3, and steam or hot air admitted into the radiating-pipes, the heat from each radiator will be communicated directly to the contents of the pan immediately above it through the mesh of the wire, and the process of evaporating the moisture contained by the fruit or vegetables will proceed. The heat introduced into the interior of the case or inclosure by the radiators causes an upward draft, the air flowing in at the bottom at the openings $h$, and after percolating through the contents of each pan and becoming laden with the vapor driven out of the fruit by the heat, escapes through the flue C.

It is well understood that the evaporation of moisture by the application of gentle heat is greatly accelerated by causing currents of air to pass over the evaporating-surfaces of the body or substance being dried, for the purpose of conveying away the vapor arising therefrom.

Heretofore fruit dried by the application of gentle heat has been held in pans having tight bottoms and sides, which prevent the air-currents from coming in contact with only the top surface of said fruit, under which circumstances the vapor is conveyed away comparatively slow.

The use of open-work or wire pans in my drying device gives me great advantage, as the upward currents of air are permitted to pass through all parts of the bottom and sides of the pans and come in contact with all of the surfaces of the strips of fruit held therein, quickly carrying off the vapor, resulting in rapid drying of the fruit.

The drawer-pans are independent of each other, and any one may be removed and replaced by another without disturbing the rest.

The front sides of the drawers are intended to fit and cover the openings in the front side of the case, so that when said drawers are at their places the inclosure of the whole is completed, and the necessity of swinging doors is obviated.

In case steam is used I design to have the ends of each pipe open into the cavities $a\ a'$, and give them a slight descent toward the latter, so that the water formed by the condensation of steam may flow to said cavity and be drawn off through a pipe, $c$.

If it be designed to use hot air in the radiating-pipes, I then introduce return-connections $f$ at the ends to cause the heat to traverse many of said pipes before being permitted to escape.

In practice, the cases or houses A may be made of any size, and if comparatively small may be arranged, as shown in Fig. 5, in pairs, on each side of a heat-supplying pipe, $k$, there being alleys $l$ left between the cases to permit of the drawers being removed and replaced.

Fruit-drying devices composed of a case or inclosure with horizontal heating-pipes therein over which to place the pans containing the fruit to be dried are old, and have been in use before my invention. Such I do not claim, broadly.

I claim as my invention—

1. In fruit and vegetable drying devices, a case, A, having hollow end walls, B B, openings $h\ h$, and flue C, and provided with a system of heating-pipes, $b$, connecting the cavities of said end walls, and arranged to form rests for evaporating-drawers $g$, all arranged substantially as shown and described, and for the purpose set forth.

2. The combination of an inclosing-case, A, having hollow end walls, B, provided, respectively, with an inlet and outlet pipe, $d$ and $e$, to the cavities of said walls, with wire drawers $g$, resting upon horizontal heating-pipes $b$, contained within said case A, substantially as set forth.

LUKE MARVIN.

Witnesses:
E. B. WHITMORE,
M. D. PHILLIPS.